United States Patent [19]

Nishikawa et al.

[11] Patent Number: 4,757,298

[45] Date of Patent: Jul. 12, 1988

[54] CERAMIC SUBSTRATES FOR TIP ELECTRONIC PARTS

[75] Inventors: Teruo Nishikawa, Miyagi; Masaru Suda, Ishinomaki; Masashi Namioka; Takuji Hatano, both of Miyagi, all of Japan

[73] Assignee: Alps Electric Co., Ltd., Japan

[21] Appl. No.: 941,415

[22] Filed: Dec. 15, 1986

[30] Foreign Application Priority Data

Jan. 29, 1986 [JP] Japan .................................. 61-15827
Jan. 29, 1986 [JP] Japan ............................. 61-10334[U]

[51] Int. Cl.⁴ ........................................... H01C 1/012
[52] U.S. Cl. .................................... 338/308; 338/309; 338/320

[58] Field of Search ................................ 338/307-309, 338/203, 315, 320, 322, 327, 333-334; 29/610 R, 620, 621, 412-414

[56] References Cited

U.S. PATENT DOCUMENTS

| | | | |
|---|---|---|---|
| 4,164,067 | 8/1979 | Brandt et al. | 29/620 |
| 4,194,108 | 3/1980 | Nakajima et al. | 29/620 X |
| 4,199,745 | 4/1980 | Barry | 338/308 X |

Primary Examiner—C. L. Albritton
Attorney, Agent, or Firm—Guy Shoup

[57] ABSTRACT

A ceramic substrate for forming electronic tip parts. At least a pair of slits is substantially parallelly formed in the ceramic substrate for forming side electrodes, and a plurality of grooves are also formed in the ceramic substrate between the slits to cross the slits so as to define together with the slits divisions respectively for the individual electronic tip parts.

6 Claims, 5 Drawing Sheets

CERAMIC SUBSTRATES FOR TIP ELECTRONIC PARTS

BACKGROUND OF THE INVENTION

1. Field of the Invention

The present invention relates to ceramic substrates for tip electronic parts such as tip resistors, tip capacitors, and so on, and particularly relates to a ceramic substrate for electronic parts in which numbers of electrodes, resistors, and the like, are formed on the substrate by printing and then the substrate is divided into pieces to obtain numbers of tip parts.

2. Description of the Prior Art

Referring to FIGS. 6 through 8, description will be made hereunder as to a structure of a conventional tip resistor and the method of manufacturing the same.

First, a slurry made by mixing ceramic powder, binder resin, etc., is molded into a thin plate-like green sheet. Grooves 2 and 3 are formed in the green sheet by press-molding. The grooves 2 and 3 are respectively arranged longitudinally and transversely at predetermined intervals as shown in the drawings so that the grooves can be used as split grooves to divide the substrate into individual tip resistors later. Next, the green sheet is baked to obtain a hard ceramic substrate 1, electrodes 4 are formed by screen printing on the ceramic substrate 1 so as to be laid over each of the grooves 2, resistors 5 are formed by printing between the adjacent electrodes 4 as shown in the drawings, an overcoat 6 of a glass material is applied over the resistors 5, the ceramic substrate 1 is baked, and then the ceramic substrate 1 is divided along the grooves 2 so as to obtain a plurality of elongated ceramic subdivisions 1a each having a train of numbers of resistors formed thereon as shown in FIG. 8. Then, side electrodes 7 and back electrodes 8 are formed at the side and back surfaces of each of the ceramic subdivisions 1a by printing so as to be connected to the electrodes 4 as shown in FIG. 7. Thereafter, each of the ceramic subdivisions 1a is divided along the other split grooves 3 of the ceramic split plate 1a, and the electrodes 4, 7, and 8 are nickel-plated and further solder-plated to thereby obtain a number of individual tip resistors A.

However, the tip resistors are individually separated by snapping the substrate along the grooves 2 and 3 formed in the substrate and therefore burrs may be easily formed at the dividing surface portions so as to make it excessively difficult to form external electrodes (side electrodes 7) which are formed after the division of the substrate.

Further, when the electrodes 4 and the resistors 5 are formed by printing on the tip resistors, it is necessary to fix the ceramic substrate 1 on a fixing board 17 and to put a mask in position thereon.

FIGS. 9, 10, and 11 are views for explaining the positioning in printing work. First, as shown in FIG. 9, two reference surfaces 17a perpendicular to each other are formed on the fixing board 17 and two sides of the ceramic substrate 1 perpendicular to each other are urged against the reference surfaces 17a by movable pins 17b so that the ceramic substrate 1 is fixed. Next, a mask 20 shaped into a predetermined pattern is put on the ceramic substrate 1 and electrodes or resistors are formed on the ceramic substrate 1 by screen-printing. In the above-mentioned printing method, however, the positioning of the mask 20 on the ceramic substrate 1 is generally performed by eye-measurement for the two sides of the ceramic substrate 1 perpendicular to each other. Assuming that a dimensional error of a special mask 20 with respect to a specific ceramic substrate 1 at two sides thereof perpendicular to each other is zero, a displacement between the specific mask 20 and the specific ceramic substrate 1 at the two sides opposite to the first-mentioned two sides is also zero. However, if a dimensional error of another ceramic substrate at two sides perpendicular to each other is a, a displacement between the above-mentioned mask 20 and the other substrate at the two sides of the substrate opposite to the first-mentioned two sides is also a. Furthermore, it is generally difficult to strictly control the dimensional accuracy of the ceramic substrate, so that the above-mentioned displacement a cannot be neglected if, for example, the fact that the shrinkage rate in baking reaches about 20 percent is taken into consideration.

Accordingly, such a method has been widely employed in which ceramic substrates 1 are classified in advance into several groups in accordance with the size of the ceramic substrates 1 and masks having specific dimensions corresponding to the respective groups are prepared, so that in printing a specific mask is selected from the prepared masks correspondingly to a specific substrate on which printing is performed to thereby minimize the error a.

Such handling, however, unnecessarily increases the kind of the masks and excessively lowers the work efficiency.

SUMMARY OF THE INVENTION

It is therefore an object of the present invention to eliminated the drawbacks in the prior art.

It is another object of the present invention to provide ceramic substrates for tip electronic parts such as tip resistors in which the ceramic substrate can be divided easily into divisions having even division surfaces with no burrs or the like.

It is a further object of the present invention to provide ceramic substrates for tip electronic parts such as tip resistors, in which manufacturing cost is reduced and the work efficiency is improved.

In order to achieve the above-mentioned object, the present invention is featured in that one of the groups of split grooves longitudinally and transversally formed in the ceramic substrate are formed in the form of slits. Similarly to the formation of the conventional split grooves, the slits can be formed by pressmolding or the like in the state where the ceramic substrate is yet in the form of a green sheet so as to make the slits have smooth end surfaces with no burr.

Further, the present invention is featured in that a position reference hole and positioning holes to be used in printing are formed in the ceramic substrate at its center portion, so that the ceramic substrate can be fixed on a fixing board with these holes and the positioning of the masks can be made on the basis of these holes to thereby minimize the error of the substrate relative to the mask due to scatter in dimension of the ceramic substrate to less than ½ of the conventional case even at the periphery of the ceramic substrate.

BRIEF DESCRIPTION OF THE DRAWINGS

The invention will be described in detail with reference to the drawings, of which.

DESCRIPTION OF PREFERRED EMBODIMENTS

Figure 1:
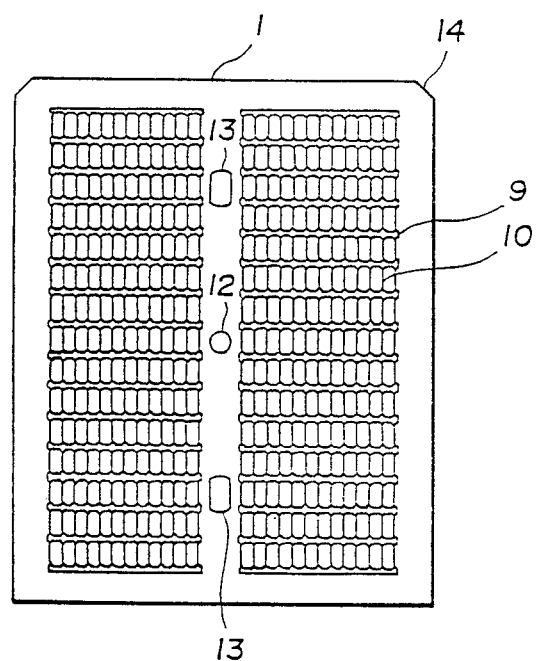
FIG. 1 shows an embodiment of the ceramic substrate according to the invention.
Figure 2:
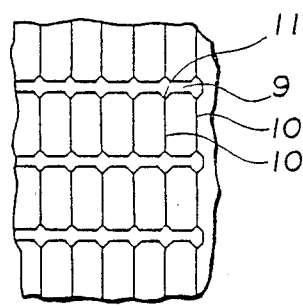
FIG. 2 is an enlarged partial view of the substrate of FIG. 1.

FIG. 1 shows the whole of an embodiment of the ceramic substrate according to the present invention, and FIG. 2 is a partially enlarged view of the same.

The materials and the method of forming slits, holes, of a ceramic substrate 1 per se are the same as those described above as to the conventional ceramic substrate, and therefore description will be omitted.

The ceramic substrate 1 is rectangular. In the substrate 1, a plurality of slits 9 are transversely and formed in parallel at regular intervals at the opposite sides of the center and grooves 10 are equidistantly formed between the slits 9 in the direction perpendicular to the slits 9. A small section defined by a pair of the slits 9 and a pair of the grooves 10 constitutes a body portion of a tip resistor finally obtained. As shown in FIG. 2, triangular notch portions 11 are formed in edges of the slits 9 crossing the grooves 10 to thereby make the division easy and form chamfered portions of the respective tip resistors after the division.

A circular hole 12 and two elongated holes 13 are formed in the ceramic substrate 1 at the central portion thereof. The circular hole 12 acts as a reference hole for performing positioning in print-forming and the elongated holes 13 are used for longitudinal positioning, as will be described later.

Chamfers 14 are formed at the upper opposite end corners of the ceramic substrate 1 in the drawing to thereby judge the direction in setting the ceramic substrate 1 when electrodes, resistors, or the like, are printed thereon.

Referring to FIGS. 3 (a) through (f), and FIGS. 4 and 5, a method of manufacturing the tip resistors by using the ceramic substrate 1 will be described hereunder.

FIG. 3 shows a process of manufacturing the tip resistors. As shown in FIG. 3(a), prepared is the ceramic substrate 1 which is provided beforehand with the equidistantly formed slits 9, the grooves 10 formed in the surface of the ceramic substrate 1 equidistantly between the slits 9 so as to cross the slits 9, and the notch portions 11 formed at portions at which the grooves 10 and the slits 9 cross each other, and so on. The slits 9, the grooves 10, and the notch portions 11 are press-molded in a ceramic green sheet which are not yet baked similarly to the conventional method. The green sheet is then baked to obain the hard ceramic substrate 1.

Figure 3A:
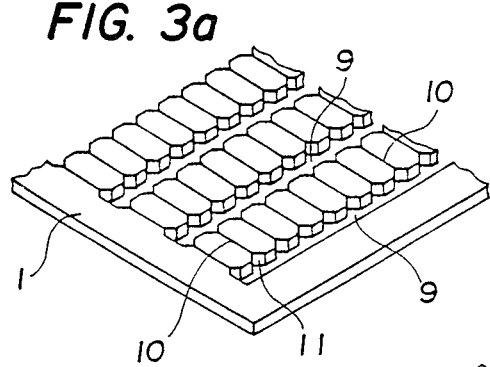
FIGS. 3(a)-3(f) show a process for manufacturing tip resistors using the ceramic substrate of the invention.
Figure 3B:
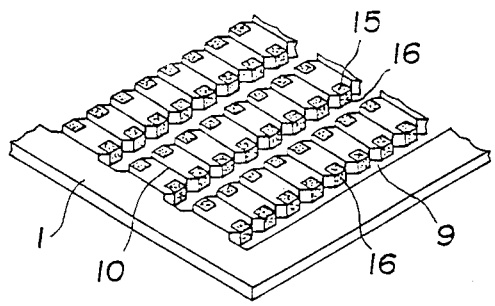

First, surface electrodes 15 and side electrodes 16 as shown in FIG. 3(b) are formed on the ceramic substrate 1. The electrodes are formed through printing correspondingly to the respective minimum sections defined by the slits 9 and the grooves 10.

Figure 3C:
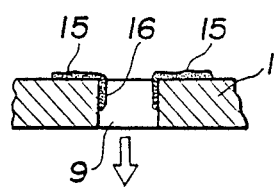
Figure 4:
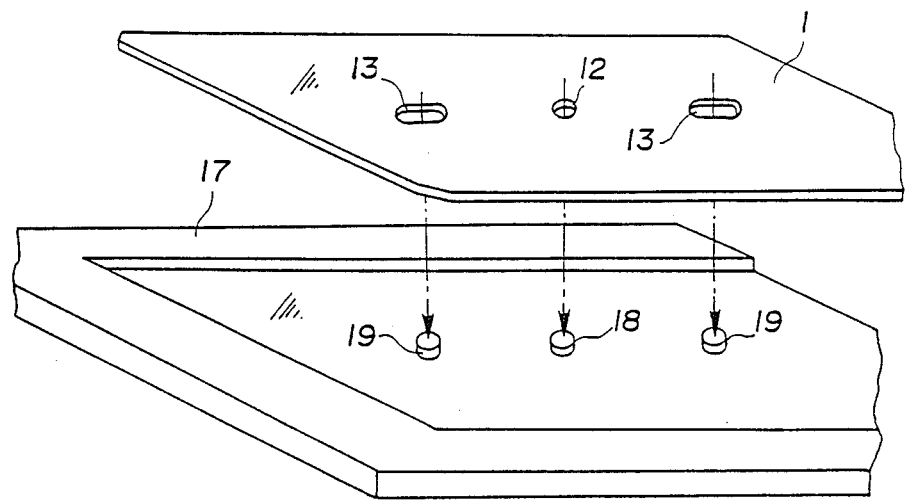
FIG. 4 shows the positioning of the ceramic substrate on a fixing board.
Figure 5:
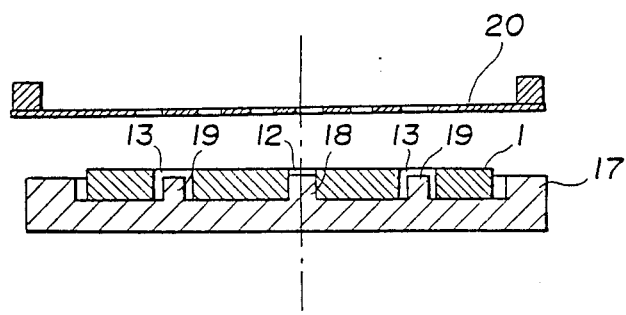
FIG. 5 shows a mask positioned for printing electronic patterns on the substrate.
Figure 6:
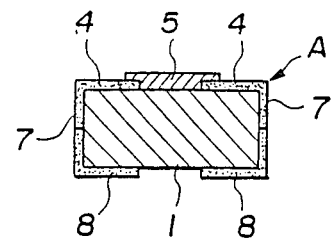
FIG. 6 is a plan view of a ceramic substrate of the prior art.
Figure 7:
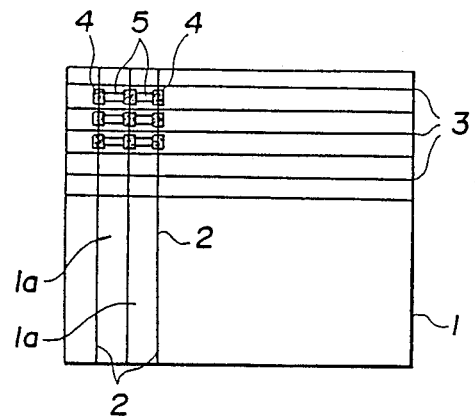
FIGS. 7 and 8 are a schematic side view and a perspective view of a row of electronic parts formed on a substrate of the prior art.
Figure 8:
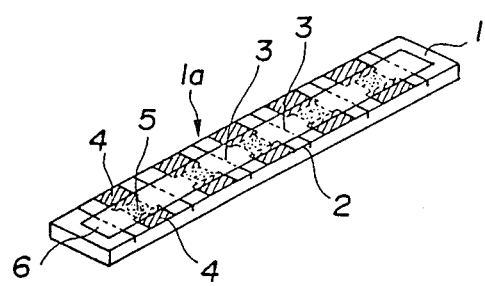
Figure 9:
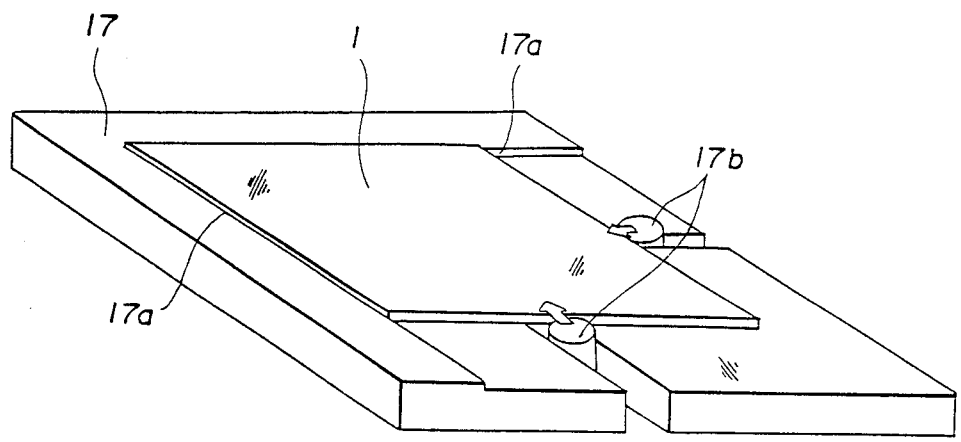
FIGS. 9, 10, and 11 show conventional procedures for positioning a ceramic substrate for printing of electronic parts.
Figure 10:
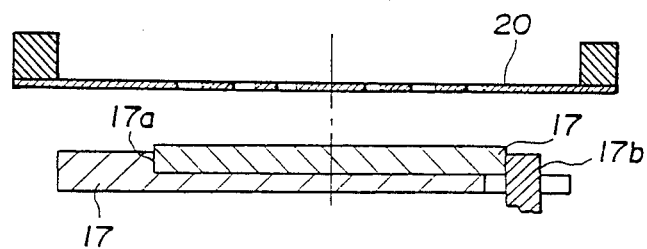
Figure 11:
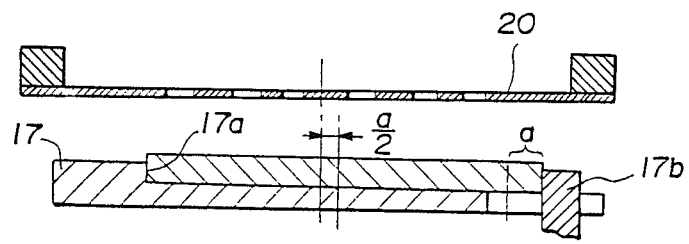

FIGS. 4 and 5 are view for explaining the print-forming. The ceramic substrate 1 is fixed on a fixing board 17 by fitting a center pin 18 and two side pins 19 provided on the fixing board 17 into the position reference hole 12 and two positioning holes 13 and 13 respectively. A mask 20 is put on the ceramic substrate 1 while positioning the mask by the center pin 18 and the side pins 19, and the surface electrodes 15 and the side electrodes 16 as shown in FIG. 3(b) are formed through printing on the ceramic substrate 1. At that time, portions at the slits 9 are sucked from the under side of the ceramic substrate 1 to make the surface electrodes 15 partly extend to form the side electrodes 16 as shown in FIG. 3(c).

Figure 3D:
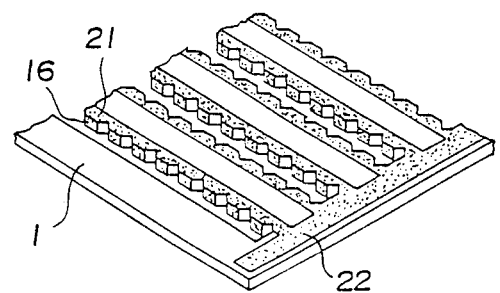

Back surface electrodes 21 are also formed on the back surface of the ceramic substrate 1 in quite the same manner as the surface electrodes 15. The back surface electrodes 21 are continuously formed along the respective slits 9 and the respective rows of the back surface electrodes 21 are connected with each other at the end portions of the respective slits 9 to form a plating conductor portion 22, as shown in FIG. 3(d). At that time, other side electrodes are formed on the side surfaces of the slits 9 by suction printing similarly to the case of forming the side surface electrodes 16 such that the thus formed other side electrodes are connected with the previously formed side electrodes 16 to thereby cover all the side surfaces of the slits 9.

Figure 3E:
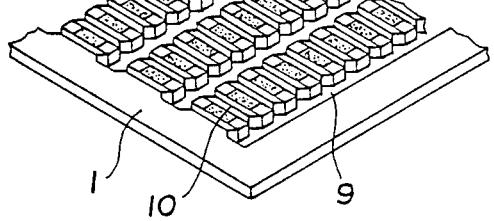
Figure 3F:
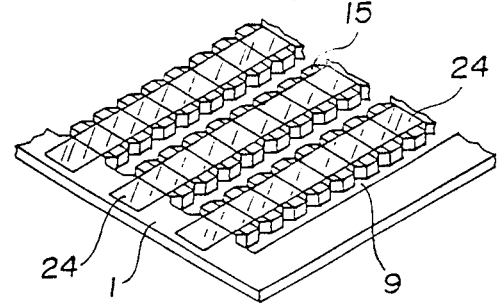

Next, as shown in FIG. 3(e), resistors 23 are formed through printing between the surface electrodes 15 on the ceramic substrate 1. The printing method is similar to that of the electrodes 15. Each of the thus formed resistors 23 is partly removed through a known method such as laser trimming or the like so as to adjust the resistance value thereof. Upon the completion of the resistance value adjustment, the resistors 23 are overcoated at their upper surfaces with glass layers as shown in FIG. 3(f). The overcoating 24 is formed also through printing.

Succeedingly, the plating conductor portion 22 is connected with an electrode of a plating apparatus (not shown), and the surface electrodes 15, the side electrodes 16, and the back surface electrodes 21 are nickel-plated and solder-plated. Thereafter, the ceramic substrate 1 is divided at the split grooves 10 between the slits 9 so as to obtain individual tip resistors A.

Although the ceramic substrate 1 provided also on its back surface with the electrodes has been described in the embodiment, the electrodes on the back surface are not always necessary. In the case where the back electrodes are not formed, it is sufficient to form the side electrodes 16 if the suction conditions are somewhat changed in printing the surface electrodes.

Alternatively, the plating process may be performed after the individual tip resistors are divided. In that case, a barrel plating method is suitable and the respective back electrodes may be formed separately from each other.

Although the embodiment has been described as to the case of forming tip resistors, it is apparent that the present invention can be applied to a ceramic substrate for forming tip capacitors. In that case, the electrodes are printed not on the ceramic substrate after baked, but on the ceramic substrate before baked (that is in the state of a green sheet).

As described above, according to the present invention, one of groups of longitudinal and transversal grooves for dividing a ceramic substrate into individual tip parts are formed in the form of slits in the ceramic substrate. Accordingly, after the ceramic substrate is divided, each of the individual tip parts has a pair of smooth side surfaces formed by a metal mold so that it is possible to form the side surface electrodes uniformly and simultaneously with the surface electrodes or the back surface electrodes. Thus, the manufacturing process can be performed easily without increasing the manufacturing steps.

Further, according to the present invention, position reference hole is formed in the ceramic substrate at its center portion and positioning holes are also formed in the ceramic substrate at the positions somewhat separated from the position reference hole. Accordingly, when the electrodes, the resistors, and the like are printed on the ceramic substrate, the positioning of the mask with the ceramic substrate can be performed on the basis of the center portion of the ceramic substrate so that displacement between the mask and the ceramic substrate can be made less even for the ceramic substrates which have difficulties in controlling dimensions and which have large scatters in dimension. As the result, there is no necessity of the preparation of various masks different in size and therefore the efficiency in printing work can be improved.

What is claimed is:

1. A ceramic substrate for forming a plurality of electronic tip parts, in which said parts are defined divisibly on said ceramic substrate prior to baking said ceramic substrate, patterns of electrodes and electronic elements connected thereto are formed for said defined parts of said ceramic substrate after baking thereof, and said patterned parts are then separated into individual electronic tip parts by dividing said ceramic substrate, comprising:

at least a pair of slits formed in a first direction of said ceramic substrate substantially parallel and spaced apart from each other in order to define opposite end sides of at least one row of said parts;

a plurality of grooves formed in said ceramic substrate spaced apart at intervals and extending in parallel along a second direction perpendicular to the first direction so as to cross said pair of slits at right angles, each adjacent pair of grooves crossing said pair of slits defining one of said parts with its opposite end sides defined by said pair of slits; and triangular notch portions formed at each crossing of each of said grooves with each of said slits so as to define chamfered portions for the opposite end sides of each of said parts.

2. A ceramic substrate for electronic tip parts according to claim 1, in which a position reference hole used in printing said patterns is formed in said ceramic substrate at a center portion thereof, and positioning holes are formed in said ceramic substrate at portions somewhat separated from said position reference hole.

3. A ceramic substrate for electronic tip parts according to claim 2, in which said tip parts to be divided by said slits and said grooves are arranged in rows at the opposite sides of said position reference hole and said positioning holes.

4. A ceramic substrate for electronic tip parts according to claim 1, in which electrodes are formed at upper and lower end surfaces and side surfaces of portions of said ceramic substrate sandwiching said respective slits in advance of division of said ceramic substrate.

5. A method of forming a plurality of electronic tip parts from a ceramic substrate, comprising the steps of:

defining said parts divisibly on said ceramic substrate prior to baking said ceramic substrate by:

(a) forming at least a pair of slits in a first direction of said ceramic substrate substantially parallel and spaced apart from each other in order to define opposite end sides of at least one row of said parts, (b) forming a plurality of grooves on said ceramic substrate spaced apart at intervals and extending in parallel along a second direction perpendicular to the first direction so as to cross said pair of slits at right angles, each adjacent pair of grooves crossing said pair of slits defining one of said parts with its opposite end sides defined by said pair of slits, and (c) forming triangular notch portions at each crossing of each of said grooves with each of said slits so as to define chamfered portions for the opposite end sides of each of said parts; then baking said ceramic substrate, printing patterns of electrodes and electronic elements connected thereto for said defined parts of said ceramic substrate after baking thereof, and separating the defined and printed electronic tip parts by dividing said ceramic substrate.

6. A method of forming a plurality of electronic tip parts according to claim 5, further comprising forming a position reference hole at a center portion of said ceramic substrate and positioning holes spaced on either side of the position reference hole prior to baking, then after baking, printing said patterns on said substrate by using a mask which is positioned on said substrate using said center reference hole and said positioning holes.

* * * * *